S. R. THOMPSON,

Assignor, by mesne assignments, to W. C. McKEAN, G. H. JACKSON, & J. BROWN, Jr.

Bushing for Faucet-Holes.

No. 8,483. Reissued Nov. 12, 1878.

Witnesses,

Geo. H. Graham

Howard T. Stevens

Inventor,

Saml. R. Thompson, by Chas. H. Forbes

Atty.

N. PETERS, PHOTO-LITHOGRAPHER, WASHINGTON, D. C.

UNITED STATES PATENT OFFICE.

SAMUEL R. THOMPSON, OF BOSTON, MASSACHUSETTS, ASSIGNOR, BY MESNE ASSIGNMENTS, TO WILLIAM C. McKEAN, GEORGE H. JACKSON, AND JEFFERSON BROWN, JR.

IMPROVEMENT IN BUSHINGS FOR FAUCET-HOLES.

Specification forming part of Letters Patent No. 141,473, dated August 5, 1873; Reissue No. 8,483, dated November 12, 1878; application filed October 29, 1878.

*To all whom it may concern:*

Be it known that I, SAMUEL R. THOMPSON, of the city of Boston, in the county of Suffolk and State of Massachusetts, have invented a new and useful Improvement in Bushings for Faucet-Holes; and I do hereby declare that the following is a full, clear, and exact description thereof, reference being had to the accompanying drawings, forming a part of this specification, in which—

Figure 1:
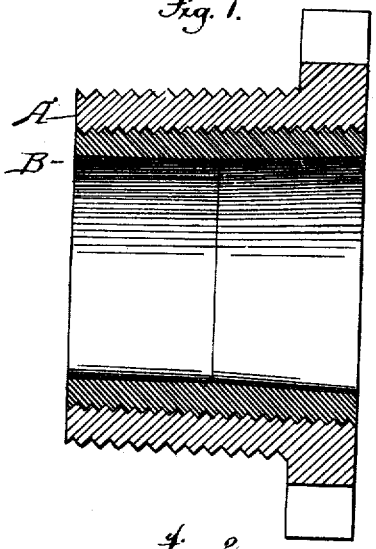
Figure 2:
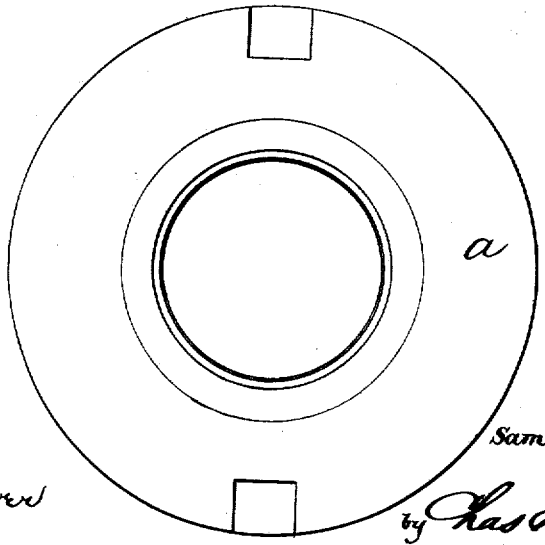

Figure 1 is a central longitudinal section, and Fig. 2 a front view, of a device embodying my invention.

Similar letters of reference indicate corresponding parts in each figure.

This invention relates to certain new and useful improvements in bushing for faucet-holes of barrels, &c., having for its object the production of a simple, economical, and effective bushing that will admit of an easy adjustment and removal of the faucet without injury to the barrel, and that may be readily and cheaply removed.

The invention consists, broadly, in a device composed of a rigid sleeve or casing to be inserted within the faucet-hole, and provided with a yielding lining.

The invention further consists of a special construction of lining, as hereinafter more fully described, to allow the faucet to be readily withdrawn.

In order to enable others to understand and use my invention, I will first proceed to describe a device embodying the same, and to subsequently point out in the claims its distinguishing features.

In the drawings, A represents a metal or other suitable rigid sleeve or casing, constructed of a tapering shape, and provided at its outer end with a lip or flange, *a*, formed to receive a wrench or key for screwing the casing in or out of the barrel.

B represents a lining of wood or other suitable material, formed of a corresponding tapering shape, and connected with the metal casing A by means of screw-threads. The interior of this lining is made of a gradually-diminishing diameter from its ends to the center, the double-beveled formation causing the faucet to bear circumferentially and to be securely held, and yet permit a movement of the same in any direction to facilitate its removal.

Having thus fully described my invention, what I claim, and desire to secure by Letters Patent, is—

1. A compound bushing for faucet-holes of barrels, &c., consisting of a rigid sleeve or casing and a yielding lining, B, as set forth.

2. The combination of a casing, A, and a lining, B, having a double-beveled internal formation, as shown and described, and for the purpose set forth.

SAMUEL R. THOMPSON.

Witnesses:
JAMES CLEM,
WILLIAM H. PREBLE.

Correction in Reissue Letters Patent No. 8,483.

It is hereby certified that the word "removed," occurring in the twenty-third line of the printed specification, is *renewed* in the original specification on file in this Office.

January 21, 1879.